H. K. SANDELL.
CONTROL SYSTEM FOR RECTIFIERS.
APPLICATION FILED SEPT. 11, 1916.
1,329,799.
Patented Feb. 3, 1920.
5 SHEETS—SHEET 5.
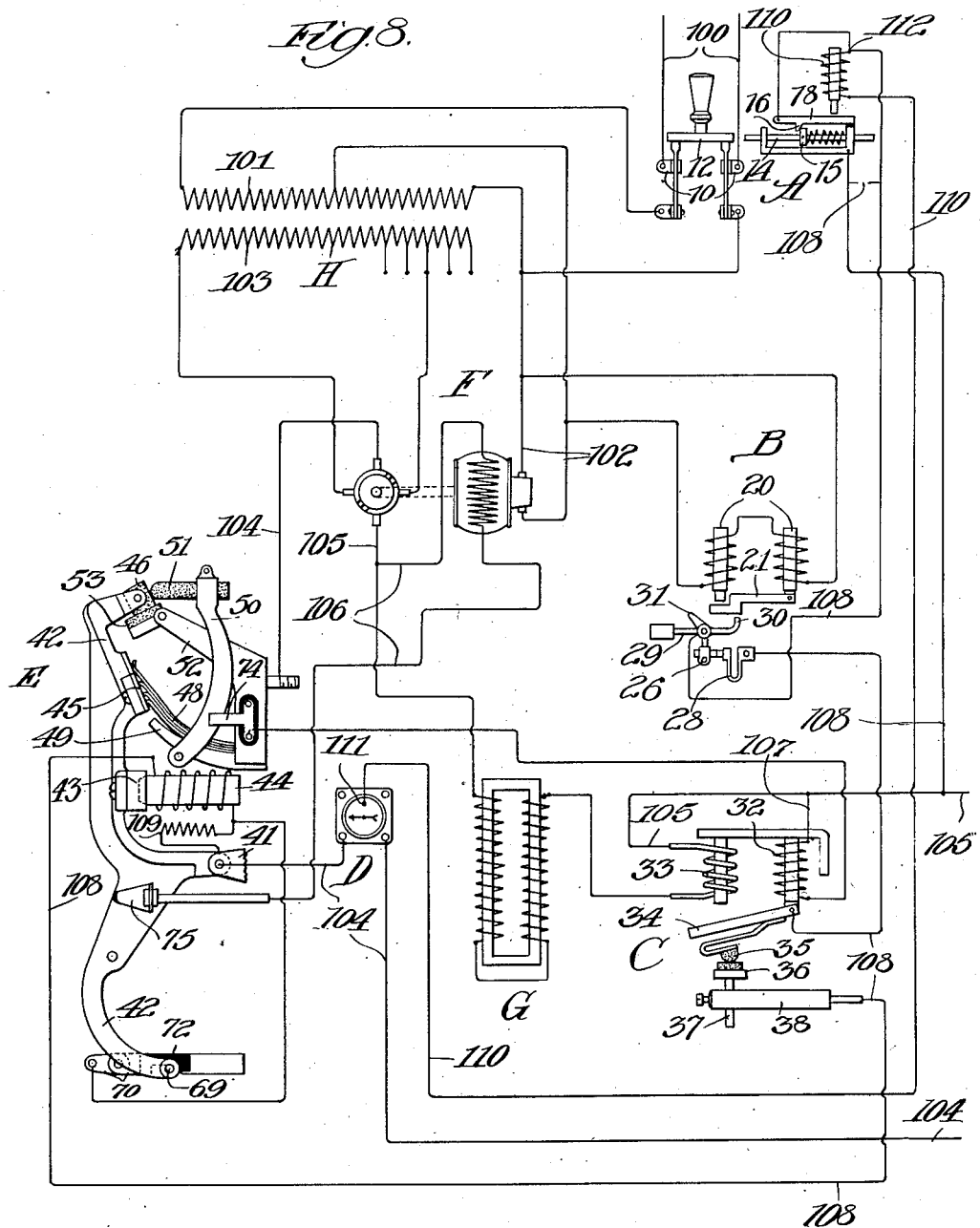

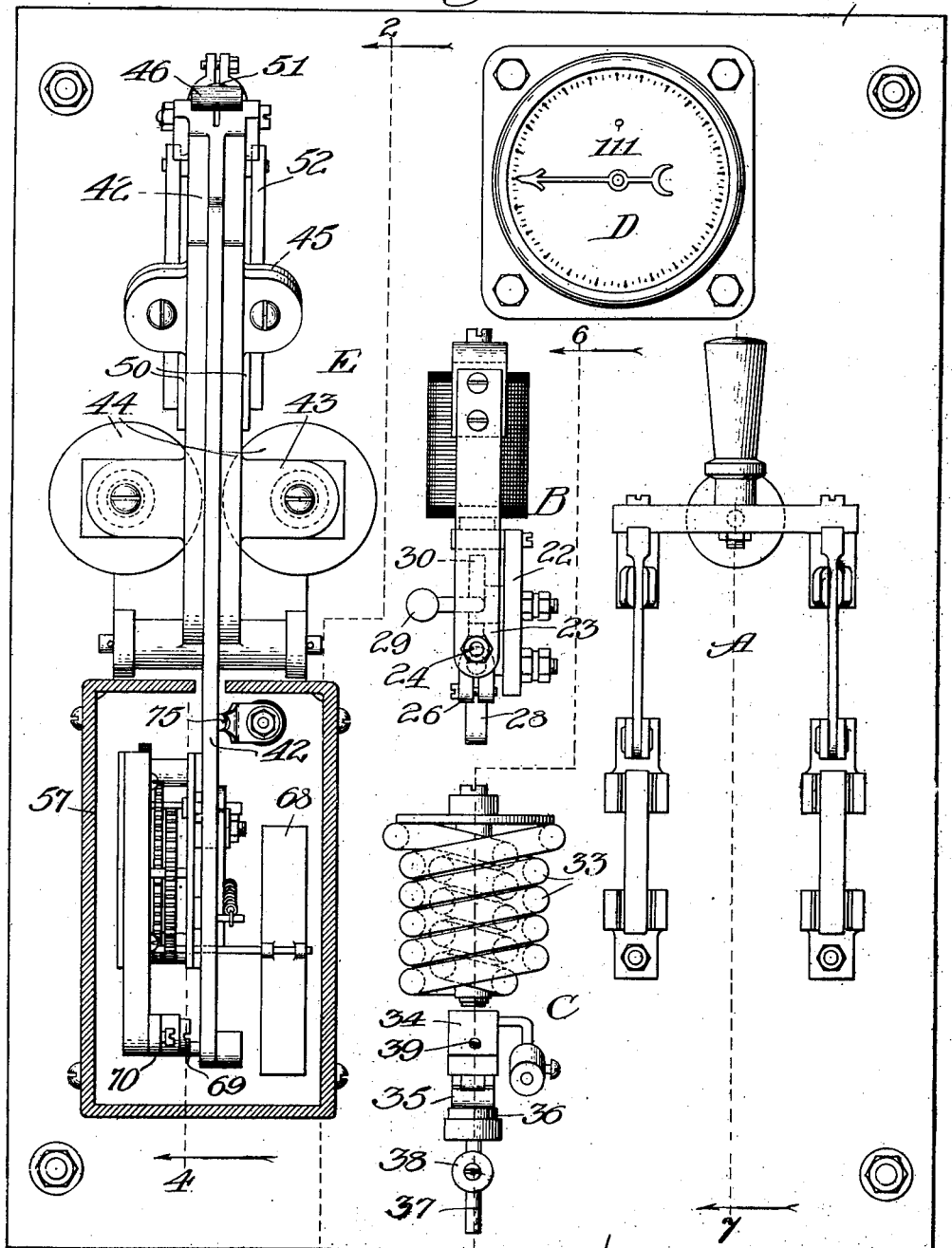

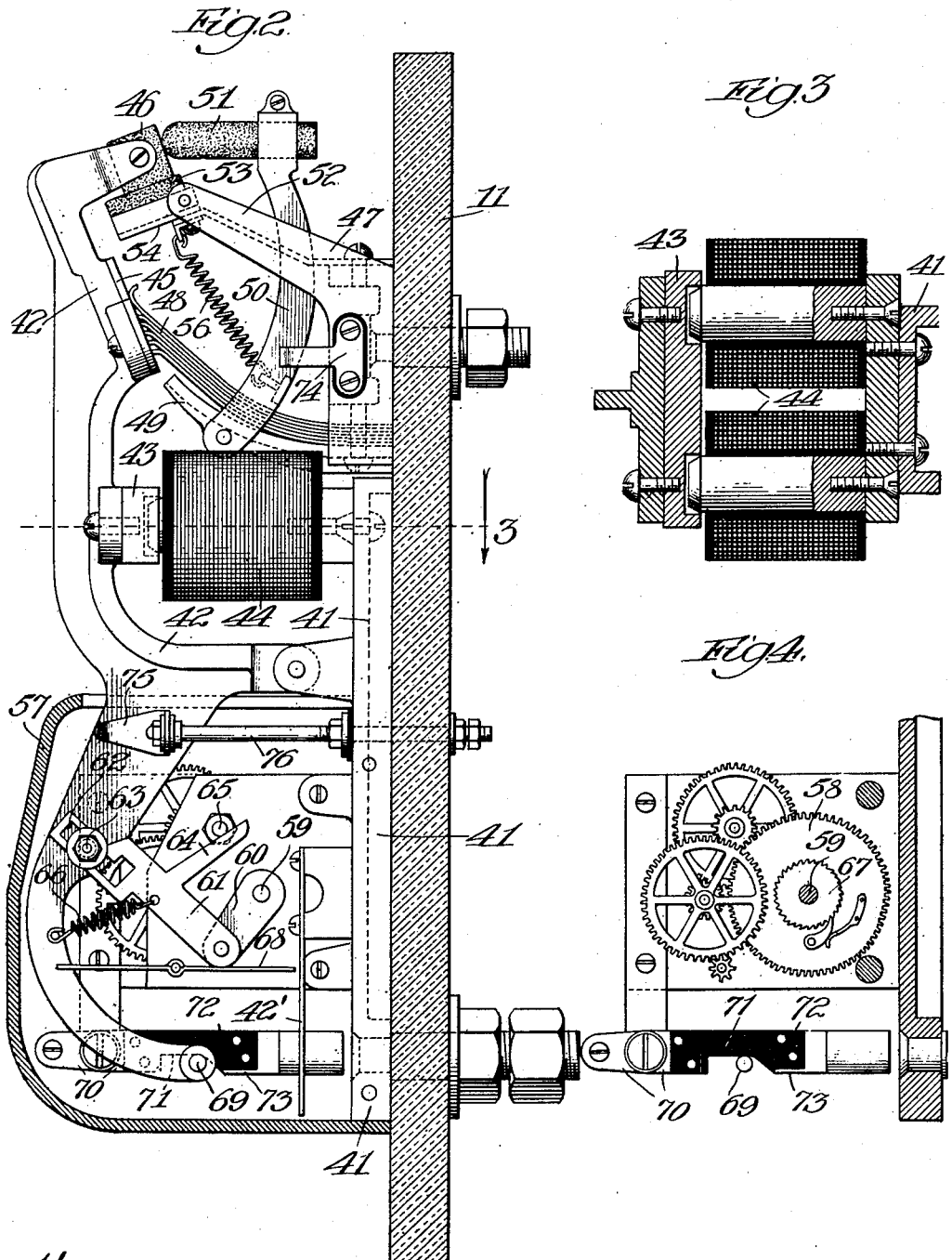

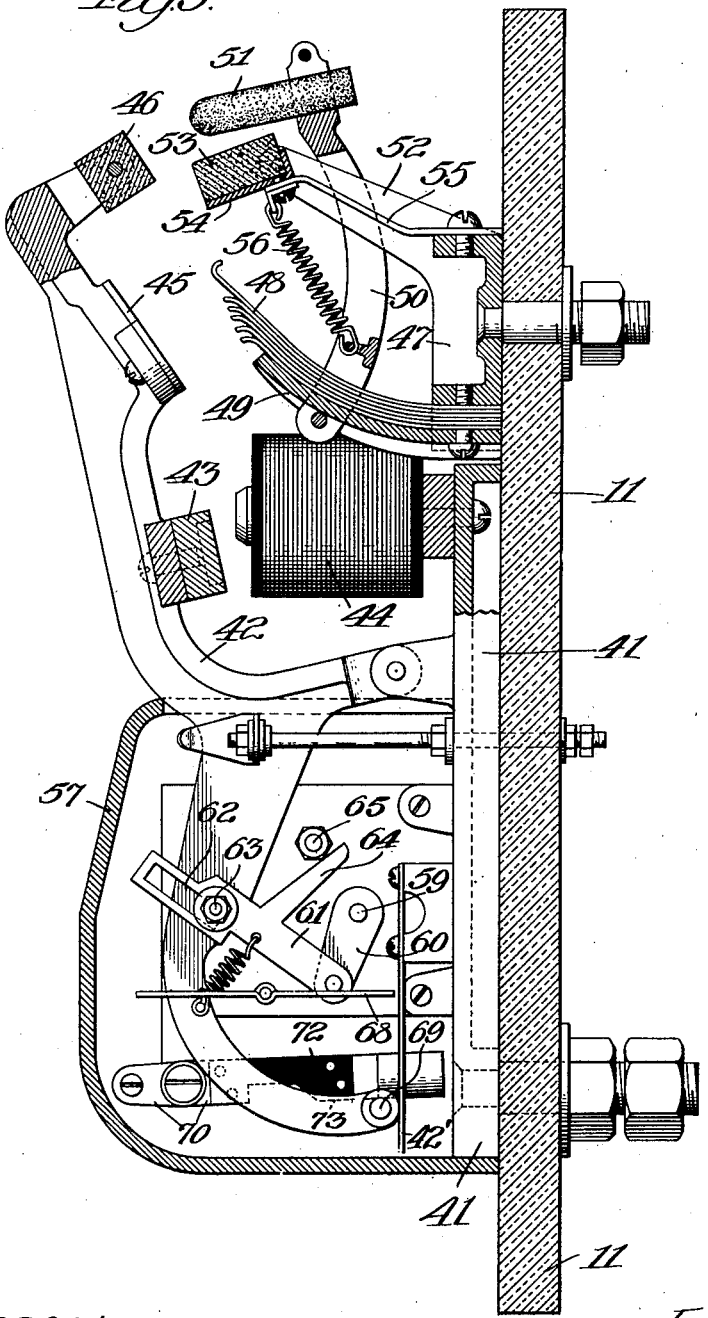

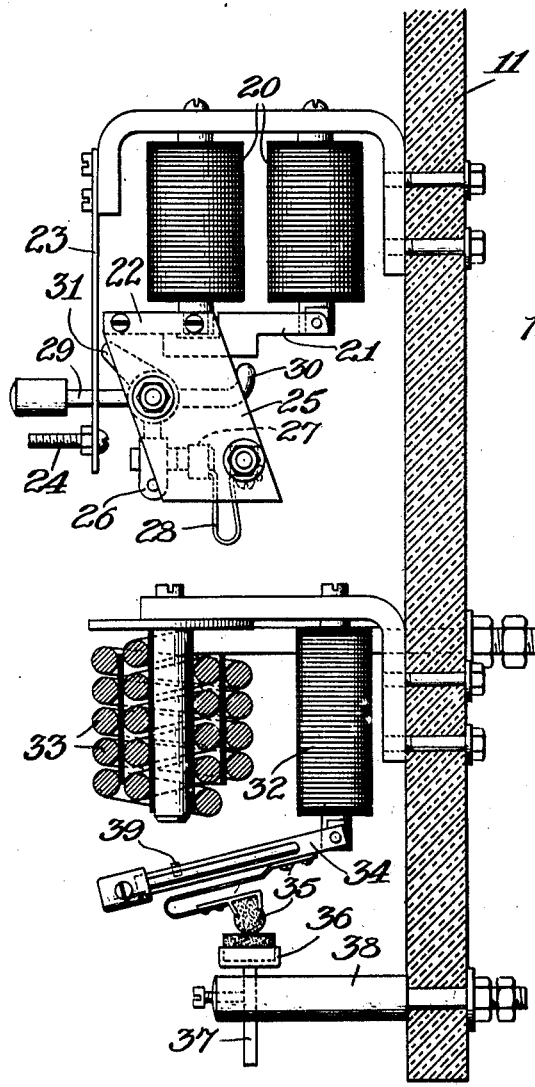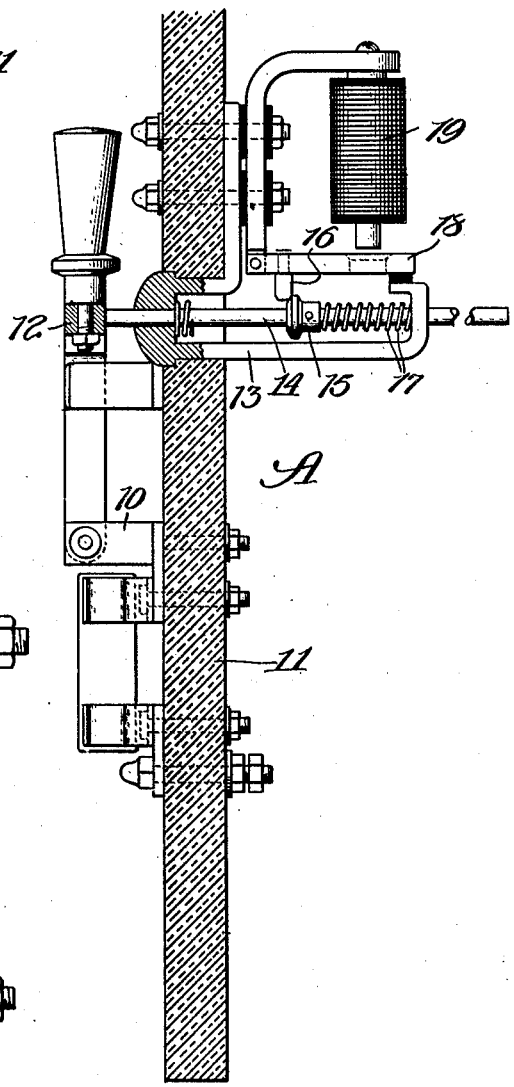

UNITED STATES PATENT OFFICE.

HENRY K. SANDELL, OF CHICAGO, ILLINOIS, ASSIGNOR TO HERBERT S. MILLS, OF CHICAGO, ILLINOIS.

CONTROL SYSTEM FOR RECTIFIERS.

1,329,799.  Specification of Letters Patent.  Patented Feb. 3, 1920.

Application filed September 11, 1916. Serial No. 119,460.

*To all whom it may concern:*

Be it known that I, HENRY K. SANDELL, a citizen of the United States, residing at Chicago, in the county of Cook and State of Illinois, have invented a new and useful Improvement in Control Systems for Rectifiers, of which the following is a specification.

My invention relates to improvements in controlling apparatus for alternating-current rectifiers, and more particularly to an arrangement of control-devices for use in connection with a synchronously driven commutating rectifier designed for charging storage batteries. The invention will be fully understood from the following detailed description in connection with the accompanying drawings. In the drawings, Figure 1 is a front elevation, partly in section, of a switch-board upon which my control apparatus is assembled; Fig. 2 is a vertical sectional view through the circuit-breaker and taken substantially on the line 2—2 of Fig. 1; Fig. 3 is a transverse section on the line 3 of Fig. 2; Fig. 4 is a detail section on the line 4 of Fig. 1 and showing the gear-train for the escapement or damper-mechanism; Fig. 5 is a sectional view of the circuit-breaker similar to Fig. 2 but showing the breaker in the open position; Fig. 6 is a section through the switch-board on the line 6—6 of Fig. 1, showing the A. C. relay in side elevation, and the D. C. reverse current and overload relay partially in section and partially in elevation; Fig. 7 is a section on the line 7 of Fig. 1 and showing the A. C. switch and the automatic control for the same, partially in section and partially in elevation; and Fig. 8 is a diagrammatic representation of the entire system, showing the electrical connections of the apparatus.

In order that the general relations and functions of the several distinct devices which make up my control system may be better understood, reference will first be had to Fig. 8. In this figure, the letter A designates the main switch or alternating-current switch and the automatic throw-out mechanism associated with the same; the letter B designates an alternating-current relay designed to become operative when the frequency of the alternating current varies beyond predetermined limits; the letter C designates a direct-current relay for operation under overloads or reverse current on the D. C. side of the apparatus; the letter D designates a meter by which the circuit is automatically opened when a predetermined charge has entered the battery, or, optionally, when the battery has been on charge for a predetermined length of time; and the letter E designates a circuit-breaker through which the main charging-current passes and which is automatically operable through the other control-devices with which it is associated, as will later appear. The letter F designates a synchronously-driven rectifying-device, and the letter G designates an inductance in series therewith. H designates the transformer which, as illustrated, is of the combined auto-transformer and double-winding-transformer construction.

Alternating-current switch.

Referring more particularly to the drawing, the numeral 10 designates a double-pole single-throw knife-switch of standard construction, which is mounted upon the switchboard 11 preferably in the vertical position shown in Fig. 7. Directly behind the bridge-piece 12 of the switch, the switchboard is perforated to receive a barrel 13 in which there is mounted for horizontal movement a plunger-rod 14. Intermediate the length of the plunger the latter has pinned thereto a metallic collar 15 which serves as a contact for engagement with a depending lug 16, and at the same time forms an abutment for a compression-spring 17 which is confined between the outer end of the barrel and the collar. The lug 16 is carried in a pivoted armature-member 18. Above the armature 18 there is supported upon a suitable bracket a magnet-coil 19. The armature 18 normally rests upon an insulated button on the outer end of the barrel 13, and in such position, the lug 16 not only makes contact with the collar 15 but serves as a lock to hold the plunger 14 in the retracted position shown in Fig. 7. When the magnet 19 is energized, the armature 18 is lifted, thereby freeing the plunger. Under the force of the compression-spring 17 the plunger is driven outwardly, and, through engagement of its outer end with the bridge 12 of the switch, the latter is forced open. The proportions of the parts are such that with the plunger 14 in its outer position, the armature 18 may again come to rest on the barrel 13 without the lug 16 contacting with the plunger or collar.

A. C. relay.

A U-shaped bracket mounted on the switch-board 11 carries a double-pole electro-magnet 20, one pole-piece of which has pivoted thereto an armature 21 which extends below and is normally held by magnetic attraction against the opposite pole-piece, as shown in Fig. 6. The latter is extended outward, as indicated at 22, in proximity with a depending leaf-spring 23 of magnetic metal cantalivered upon the supporting bracket. Some means, such as the screw 24, is preferably provided for weighting the free end of the spring in order to secure a proper adjustment of the periodic time or natural frequency of vibration of the spring.

The extended pole-piece 22 supports a depending-plate 25 (of non-magnetic material) which has pivoted thereto for oscillation in a vertical plane a four-armed lever. The depending arm 26 of this lever carries a contact-piece which is normally in engagement with a stationary contact 27 shown as supported by a U-shape spring 28. The outwardly-extending horizontal arm 29 of the lever carries a counter-weight which serves to normally hold the contact of the depending arm in engagement with the stationary contact, while the inwardly-extending horizontal arm 30 of the lever lies beneath the pivoted armature 21 and has its end upturned for engaging the latter. The fourth arm of the lever, designated 31, is inclined outwardly and forwardly into proximity with the spring 23.

The spring 23 is so proportioned as to have a natural periodic time somewhat less than the frequency of the alternating-current by which the magnet 20 is energized. So long as this normal frequency is maintained, therefore, the spring 23 is not substantially affected by the magnetic impulses of the pole-piece 22. As the frequency of the current supplied by the magnets 20 approaches the natural time of the spring, the latter will be set into vibration of increasing amplitude, and will eventually contact with the arm 31 of the rock-lever to oscillate the latter and thereby disengage the depending arm of the lever from the contact 27.

So also, if the magnets 20 become deenergized, as by interruption of the supply of alternating current, the pivoted pole-piece 21 will drop, and, through its engagement with the arm 30, will rock the oscillating lever to open the contacts. It should be noted as characteristic of the alternating current relay that the latter automatically returns to its normal position illustrated in Fig. 6, whenever alternating current of proper frequency is supplied to the magnets 20.

D. C. relay.

Referring again to Fig. 6, the numeral 32 designates a relatively small electro-magnet which is designed to be shunted with the battery being charged, and which is supported in a vertical position by a suitable bracket mounted upon the switch-board 11. The outer end of the supporting-bracket carries a second magnet 33 wound with a relatively few turns of exceedingly heavy conductor and designed to be put in series with the battery under charge. The shunt-magnet 32 has pivoted to its pole-piece an armature 34 which carries a downwardly-facing spring-held contact-member 35 adapted to rest upon a stationary contact 36 supported by a stem 37 which is adjustable vertically in a stud 38 carried by the switch-board. The armature 34 preferably carries a brass point 39 in its upper face, which is adapted to contact with the pole-piece of the magnet 33, this expedient being adapted in order to prevent the armature from "freezing" to the pole-piece when it has once been drawn into engagement therewith.

In operation, the shunt-magnet 32 and the series-magnet 33 will be so connected as to be of the same polarity. The number of turns in the winding of each magnet will further be so proportioned that with the normal charging-current flowing through the series-coil 33, the two magnets will be so nearly of equal strength that the lifting effect of the magnet 33 on the armature 34 will be insufficient to overcome the weight of the latter. If, for any reason, the charging current should substantially exceed its predetermined maximum value, the magnet 33 will be so strongly energized as to induce an opposite pole in the armature 34 and to attract the latter, thereby opening the contacts 35, 36. So, also, if there should be a reverse current through the magnet 33, the polarity of the latter would be opposite to that of the armature 34, thereby setting up a force of attraction sufficient to open the contact-points 35, 36. By vertical adjustment of the stem 37, the clearance between the magnet 33 and the armature 34 may be varied to secure the desired limit of overload under which the relay is to become operative.

Circuit breaker.

The mechanical construction of the circuit-breaker is shown in detail in Figs. 1 to 5. Referring to these figures, the numeral 41 designates a base-plate which is mounted upon the switch-board 11 and carries a pair of outstanding ears between which there is pivoted for oscillation in the vertical plane a contact-arm 42. This arm has mounted thereon above its pivot-point a magnetic-metal armature-block 43 which approaches and recedes from the poles of an operating magnet 44 mounted on the upper end of the base 41. Above the armature 43, the arm 42 carries a contact-face 45, and the upper end of the arm is forked to embrace the carbon-contact block 46.

For engaging the face 45 and carbon-block 46 the switch-board 11 carries three distinct contact elements, all of which are mounted upon a separate base 47. The lower edge of the base 47 has secured thereto a laminated contact-member formed of a plurality of copper strips 48, the outer or free ends of which are bent to insure contact between each of the strips and the plate face 45. The strips 48 are normally held in the curved position shown by a rigid arm 49 of appropriate form, which at the same time serves as a bracket for the mounting of a pivoted contact-arm 50 which extends upwardly and has a graphite-rod 51 of relatively high resistance carried in its outer end in position to engage the carbon-block 46. The upper end of the base 47 carries outwardly and upwardly inclined bracket-arms 52 between the ends of which there is journaled a carbon-block 53, a suitable horizontal pivot-pin being employed for the purpose. The block 53 is secured in a metallic base 54, to which is screwed the end of a leaf-spring 55 carried by the base 47, the spring having a set which tends to throw the pivoted block 43 upwardly. A helical tension-spring 56 has one end caught in the mounting of the block 53 and the other end secured to the swinging-arm 50, whereby the latter is normally urged outwardly in a position to engage the block 46 of the circuit breaker arm 42.

The lower end of the arm 42 enters a slot within the upper end of a housing 57 within which there is mounted an escapement gearing generally designated by 58, and best illustrated in Fig. 4. The driving-shaft 59 of this escapement-gearing carries a crank-arm 60 with which there is connected a link 61 having an L-shaped slot 62 in its outer end, which slot receives a pin 63 in the circuit-breaker arm 42. An arm 64 projects outwardly at a slight angle to the link 61 and is adapted to engage a release-stud 65 carried by the face-plate of the escapement gearing. A helical tension-spring 66 is stretched between the lower portion of the arm 42 and the link 61, in order that the link 61 may be moved to engage the angular end of the slot 62 with the stud 63.

The driving-shaft 59 of the escapement-gearing is connected with this gearing only through a ratchet-wheel 67 (Fig. 4) with which there coöperates a spring-held pawl on the main driving-gear. Through this main driving-gear and through the intermediate gear-train illustrated, rotation of the driving-shaft 59 in clockwise direction, as viewed in Fig. 4, operates at greately increased speed an air-vane 68 (Fig. 2), and it is by the resistance to motion of this vane that the speed of the drive-shaft 59 is held down to the desired limit.

The extreme lower end of the arm 42 is curved inwardly and carries a laterally-projecting pin 69 which coöperates with a contact-device in the form of a pivoted lever 70 formed of metal and notched intermediate its length, as indicated by the dotted lines 71 in Fig. 4, and having riveted thereto an insulating plate 72 the notch of which is shallower than is the notch in the arm itself. The insulation 72 is cut away from the lower end to expose the metal of the arm at the outer end of the notch, as indicated at 73 in the drawing.

The circuit-breaker base 41 carries a spring leaf 42¹ which extends downwardly into the path of the lower inturned end of the arm 42 and serves as a yielding stop for the same.

In addition to the parts mentioned, the circuit-breaker construction includes two additional contact-devices, one being in the form of an arm 74 secured to, but insulated from, the upper base 47 and adapted to engage the swinging arm 50 in one position of the latter, as shown in Fig. 2. The second contact-device is of similar construction, embodying a pair of inturned spring contact-fingers 75 mounted on a stud 76 which is insulated from the circuit-breaker base 41. The contacts 75 are out of contact with the arm 42 in the open position of the latter, and come into engagement therewith sometime before the arm reaches the closed position.

The mechanical operation of the circuit-breaker is as follows. Assuming that the arm is in the open position shown in Fig. 5, all of the various contacts of the arm will be open save only the contact between the pin 69 at the lower end of the arm and the metallic portion 73 of the pivoted contact-piece 70. If the magnet 44 be now energized, the arm will be drawn toward the closed position, and in such movement the link 61 will operate through the crank-arm 60 and shaft 59 to drive the air-vane 68. Through the braking effect of this vane therefore, the closing movement of the arm will be dampened or retarded to the desired extent. As the arm continues to move toward the closed position, the projecting portion 64 of the link 61 will engage the pin 65, and by continued movement of the parts, the link will be oscillated to free the pin 63 on the arm 42 from the angular end of the slot 62. The circuit-breaker arm will therefore be automatically released from the dampening mechanism and will move quickly to the full closed position. In such movement, the carbon-rod 51 will first engage the block 46 in the end of the arm, the block 46 will next engage the upper face of the pivoted block 53, and finally, the contact fingers 48 will engage the contact-face 45. During the closing movement of the arm the spring contact-fingers 75 will have engaged the same shortly before any of the arm contacts proper come into engagement, and the spring contacts 74 will have engaged the carbon-carrying arm 50 after the latter has been moved rearwardly a predetermined distance. So also, as the arm approaches the closed position, and approximately at the time when the dampening mechanism is released, the pin 69 in the bottom of the arm rides off of the metallic portion 73 and onto the insulated section 72 of the pivoted lower contact 70.

If, through any cause, the magnets 44 should be deënergized, the circuit-breaker arm will be practically instantaneously returned to the open position, both through the force of gravity and through the action of the spring contact-fingers or leaves 48 and the spring-held contact-arm 50. In the opening movement of the circuit-breaker arm the contact will first be broken between the metallic fingers 48 and the face 45, next between the carbon-block 46 and the block 53, and last between the block 46 and rod 51. Through the ratchet connections between the shaft 59 and the air-vane gear-train, the circuit-breaker arm is permitted to open freely and without the resistance or braking effect of the air-vane.

*Electrical connections and operation of the system.*

The four control-devices specifically described in the foregoing are associated with one another and with the other apparatus required to make up the complete control system in the manner illustrated in Fig. 8. The alternating-current switch A is in series with both conductors of an alternating-current service-line designated 100, and beyond the switch there is connected the primary winding 101 of the transformer H. The primary transformer winding also serves as an auto-transformer from which taps 102 are taken to feed the rotor of a motor of the induction type, designated as a whole by F. The coils of the alternating current relay B are also fed from the taps 102. The secondary winding 103 of the transformer H feeds a plurality of alternating-current brushes bearing upon the rectifying commutator, which is driven by the rotor referred to. This completes the alternating-current connections of the apparatus.

The direct-current connections include the conductors 104, 105, which draw current from the D. C. brushes on the rectifying commutator and feed the storage-battery charging-line and the various devices interposed between the rectifying brushes and the battery. The line 105 has in series therewith the inductance G and the series-coil of the overload and reverse-current relay C. The line 104 has in series therewith the main contacts of the circuit-breaker E and the meter D. Considering the various shunt-circuits in the order in which they appear in the diagram, the first shunt, designated 106, is interposed between the conductor 105 and the spring contact-fingers 75 which bear upon the circuit-breaker arm, this shunt serving to energize the direct-current field of the rectifier F. The second shunt, designated 107, extends between the conductor 105 and the spring-fingers 74, which bear on the lever 50 of the circuit-breaker and include the shunt-roll of the overload and reverse-current relay C. The third shunt is designated 108 and extends between the circuit-breaker base 41 and the conductor 105, and includes a resistance-member 109 in series with the shunt and in shunt with the swinging contact 70 which engages the bottom of the circuit-breaker arm 42. Beyond the juncture of the resistance-shunt 109 with the main shunt 108, the latter has in series therewith the coils of the circuit-breaker magnet 44, the contact of the overload and reverse-current relay C, the contact of the alternating-current relay B, and the contact of the alternating-current switch A. The last shunt-circuit, designated 110, extends between a contact-button 111 carried by the meter D in position to be engaged by the registering hand of the latter (which hand is electrically connected with the line 104) and the line 105, and includes, in series therewith, the coil of the alternating-current switch-magnet A, the actual connection to the line 105 being, in fact, made through this coil with the shunt 108 at the point 112.

The operation of the system above described is as follows: Assuming that the battery to be charged has been connected across the direct-current line 104, 105, the knife-switch A is closed and in such closing movement acts mechanically upon the plunger 14 (Fig. 7) to push the latter inwardly and to cause it to be latched by the lug 16 whereby the shunt 108 is mechanically closed at this point. The primary winding 101 of the transformer being energized by the closing of the A. C. switch, the taps 102 of the auto-transformer serve to energize the rotor of the rectifier F, and the latter begins to run as an induction-motor. The coils of the A. C. relay B are also energized to attract their armature 21 and permit the rocking-lever of this relay to close the shunt 108 at this point. The contact of the overload and reverse-current relay C will be in the closed position, despite the fact that there is no current in the series magnet for the reason that the shunt-circuit 107 which energizes the shunt-magnet is open between the contacts 74 of the lever 50 of the circuit-breaker. The circuit-breaker arm being in the open position, the contact-member 70 will have its metallic portion resting upon the arm, whereby the shunt 108 is closed through this branch-circuit, in addition to being closed through the resistance 109. The full battery potential will thereby be effective throughout the shunt-circuit 108, and in consequence the circuit-breaker magnet 44 will be energized to attract the arm thereof. Due to the braking effect of the air-vane before described, the arm will move slowly to the closed position, and slightly before the automatic release of the brake-mechanism, the spring-contacts 75 will engage the arm, thereby closing the shunt 106 to energize the direct-current field of the rectifier. The rectifier, which has been hitherto running as an induction-motor, will, by the action of this direct-current field, now run as a synchronous motor, and will, furthermore, automatically assume proper polarity for charging the battery which energizes the direct-current field. Almost immediately after the engagement of the contacts 75 with the circuit-breaker arm, the latter will be automatically released from its brake-mechanism and will move quickly to the closed position, the three separate main contacts of the arm closing in the order before described. In the fully closed position of the arm, the contact 74 will be engaged by the lever 50 to energize the shunt-coil of the overload relay C, so that the series and shunt-coils of this member, in effect, become energized at the same instant, and the armature thereof retains its normal position, closing the shunt 108. Furthermore, by movement of the arm 42 to the fully closed position, contact is broken between the bottom of the arm and the member 70, and the shunt 108 is now energized only through the resistance 109. The circuit-breaker magnet 44 therefore draws only a very small current during the normal operation of the mechanism, the act of closing the arm serving to reduce the current in the magnet from the full value which was necessary to secure positive closing down to the far lower value required to maintain the arm in the closed position.

If, at any time during the charging period, the alternating-current supplied to the line 100 should drop in frequency (and consequently in voltage) below the predetermined minimum, the vibrating leaf 23 of the relay would be set into oscillation of such amplitude as to engage the rocking-lever and open the shunt 108. So also, if the alternating-current supply should instantaneously fail from any cause, the magnets 20 of the A. C. relay would be deënergized to permit the armature 21 to drop and thereby open the shunt 108. Similarly, a short circuit or other condition resulting in an overload on the direct current side of the machine will act upon the series-coil of the overload relay C, so strongly energizing this series-magnet as to induce an opposite pole in the armature of the relay and attract the same to open the shunt 108 at this point. If, through any cause, the battery discharges through the lines 104, 105, such reverse current, although of very low value, will act upon the series-magnet to open the relay C.

Through any of the above-named conditions, therefore, that is, through change in cycles or failure of potential in the alternating-current side, or through over-load or reverse current in the direct-current side, the shunt 108 will be automatically opened, and, by the consequent deënergizing of the circuit-breaker magnets 44, the circuit-breaker arm will fly to the open position, and in such movement, the carbon-contact members of the arm, which break contact after the main or metal contact thereof, will prevent arcing of the metal contacts. It should also be noted that the yielding spring-stop 42' which engages the bottom of the arm 42 will permit the latter to open a gap considerably in excess of the normal open gap, thereby drawing out and breaking the arc between the circuit-breaker contacts. The arm will slowly return, however, under the influence of the spring 42' and against the resistance or braking effect of the air-vane 68, to its normal open position, and in such position the gap between the contacts of the arm and between the armature on the arm and the energizing magnet may be relatively small.

As soon as the abnormal condition which caused the opening of the shunt 108 and consequent opening of the circuit-breaker is remedied, the shunt 108 will be automatically closed, since both the alternating-current relay and the overload and reverse-current relay are capable of again automatically setting themselves when proper conditions are established. The battery voltage will therefore be effective on the shunt 108 to close the circuit-breaker, again energize the direct-current field of the rectifier to bring the latter into synchronism and in general to return the parts to their normal closed charging position. This automatic operation of the system by which the safety-devices described return to their normal position without attention, I deem one of the most important features of my invention.

When the registering hand of the meter D has moved through the predetermined distance, indicative of any predetermined ampere hour charge, or, if the meter be in the form of a time-recorder only, then at the end of any predetermined time, the hand of the meter will engage the contact 111 and close the shunt 110. The magnet of the alternating-current switch A will thereby be energized to attract the armature 18, and the plunger 14 will be released to positively open the knife-switch. At the same time, the shunt 108, and, through it, the meter-shunt 110, will be automatically opened and held open until the knife-switch is again closed by hand. At the end of the predetermined charging period, therefore, the entire system is automatically cut out.

While I have shown and described in considerable detail one specific embodiment of my invention, it will be understood that this is illustrative only, and for the purpose of making clear the nature and objects of my invention, and that I do not regard the invention as limited to these details, nor to any of them, except in so far as such limitations are included within the terms of the following claims, in which it is my intention to claim all novelty inherent in my invention as broadly as is permissible in view of the prior art.

What I claim as new and desire to secure by Letters Patent is:

1. A control system for storage-battery charging rectifiers, and including, in combination, a rectifier, a circuit-breaker in series therewith, means operable by the battery on charge for closing said circuit-breaker, and means operable by variations in the charging-current for automatically opening said circuit-breaker.

2. A control system for storage-battery charging rectifiers including, in combination, a synchronously-driven motor and a rectifying-commutator connected therewith a circuit-breaker in series with the direct-current side of said commutator, means operable by variations in the charging current for controlling the said circuit-breaker, and additional means operable by variations in the alternating-current for controlling the said circuit-breaker.

3. A control system for a storage-battery charging rectifier, comprising, in combination, a synchronously-driven motor, a rectifying-commutator connected therewith, a circuit-breaker in series with the direct-current side of the said commutator, an overload and reverse-current relay operable by the charging current and controlling the movement of the said circuit-breaker, an alternating-current relay operable by variations in the alternating-current supplied to the said rectifier and controlling the operation of the said circuit-breaker, both of said relays being of the type which returns to the running position when normal conditions are established.

4. A control system for storage-battery charging rectifiers and including, in combination, a synchronously-driven motor, a rectifying commutator connected therewith, a circuit-breaker in series with the direct-current side of the said commutator, means for normally holding said circuit-breaker in the open position, means actuated by battery potential for moving said circuit-breaker to the closed position, and an overload and reverse current relay normally closing the circuit of said circuit-breaker actuating means and operable by excessive charging-current or reverse current to open said circuit.

5. A control system for storage-battery charging rectifiers and including, in combination, a rectifier, a circuit-breaker in series with the direct-current side thereof, a shunt-circuit energized from the charging line of the said rectifier, circuit-breaker actuating means interposed in the said shunt-circuit, means operable by overload or reverse current in the charging-circuit for opening the said shunt-circuit, means operable by variations in the frequency of the alternating-current supplied to said rectifier for opening the said shunt-circuit, and means controlled by a charge meter for opening the said shunt-circuit and for simultaneously opening the alternating-current line to said rectifier.

6. A control system for storage-battery charging rectifiers, and including, in combination, a synchronously-driven motor, a rectifying commutator connected therewith, a circuit-breaker in series with the direct-current side of said commutator, means for normally maintaining said circuit-breaker in the open position, electrically-operable means for drawing said circuit-breaker to the closed position, means for energizing said last-named means from the charging line, means operable by the current of the charging-line for controlling said energizing means to open the said circuit-breaker, means controllable by the alternating-current supplied to the said rectifier for controlling said energizing means to open the circuit-breaker, a charge-meter, and means controllable through the said charge-meter for opening the alternating-current line through the said rectifier.

7. A control system for storage-battery charging-rectifiers, and including, in combination, a synchronously-driven motor, a rectifying commutator connected therewith, a normally-open circuit-breaker in series with the direct-current side of the said commutator, an electro-magnet for drawing said circuit-breaker to its closed position, a shunt for controlling the said electro-magnet, a relay for opening the said shunt having its coils energized from the charging-line, and a second relay for opening the said shunt having its coils energized from the alternating-current line.

8. In a control system for storage-battery charging-rectifiers, a synchronous motor driving a rectifying commutator, a normally-open circuit-breaker in series with the direct current side of the said commutator, direct-current-actuated electro-magnetic means for closing the said circuit-breaker, a meter, an alternating-current switch, an armature in series with the operating means for the said circuit-breaker, means actuated by movement of said armature for throwing out the said alternating-current switch, an electro-magnet for moving said armature, said magnet being in series with the armature-contact, and means controllable by the said meter for energizing said last-named magnet, whereby the said magnet opens its own circuit and simultaneously opens the alternating-current line to the said rectifier.

9. A storage-battery charging-system, including a synchronous motor, a rectifying commutator driven thereby, a circuit-breaker in series with the direct-current side of said armature, electro-magnetic means for operating the said circuit-breaker, a double-pole electro-magnet having the winding of one pole in series with said direct-current side of the commutator and having the winding of the other pole shunted across the direct-current side of said commutator, the said poles being of the same polarity under normal conditions, an armature-member pivoted to said shunt-pole and extending into operative relation with said series-pole, and means controlled by movement of said armature for opening the circuit of said electro-magnet circuit-breaker operating means.

HENRY K. SANDELL.